(12) United States Patent
Yagi et al.

(10) Patent No.: US 6,269,210 B1
(45) Date of Patent: Jul. 31, 2001

(54) OPTICAL FIBER

(75) Inventors: Kenji Yagi, Yokohama; Tomotaka Murase, Sagamihara; Keiko Shiraishi, Machida; Ken-ichi Muta, Kawasaki; Yuichi Morishita, Yokohama; Takashi Yoshida, Mito; Masaru Kobayashi, Mito; Koichi Arishima, Mito; Shin Sumida, Tsukuba, all of (JP)

(73) Assignees: Showa Electric Wire & Cable Co., Ltd., Kawasaki; Nippon Telegraph and Telephone Corp., Tokyo, both of (JP)

( * ) Notice: Subject to any disclaimer, the term of this patent is extended or adjusted under 35 U.S.C. 154(b) by 0 days.

(21) Appl. No.: 09/301,597

(22) Filed: Apr. 29, 1999

(30) Foreign Application Priority Data

Apr. 30, 1998 (JP) .................................. 10-120911
Sep. 3, 1998 (JP) .................................. 10-249846

(51) Int. Cl.⁷ ..................................................... G02B 6/44
(52) U.S. Cl. ........................................... 385/114; 385/110
(58) Field of Search ........................... 385/100–114, 128, 385/123, 126; 427/508

(56) References Cited

U.S. PATENT DOCUMENTS

| 4,828,349 | | 5/1989 | Nakasuji . | |
|---|---|---|---|---|
| 5,408,564 | | 4/1995 | Mills . | |
| 5,761,363 | * | 6/1998 | Mills | 385/114 |
| 5,945,173 | * | 8/1999 | Hattori et al. | 427/508 |
| 5,949,940 | * | 9/1999 | Botelho et al. | 385/114 |
| 6,028,976 | * | 2/2000 | Sato et al. | 385/114 |

FOREIGN PATENT DOCUMENTS

| 0 293 886 | 12/1988 | (EP) . |
|---|---|---|
| 9-325251 | 12/1997 | (JP) . |

* cited by examiner

*Primary Examiner*—Frank G. Font
*Assistant Examiner*—Sang H. Nguyen
(74) *Attorney, Agent, or Firm*—Oblon, Spivak, McClelland, Maier & Neustadt, P.C.

(57) ABSTRACT

An optical fiber ribbon includes a plurality of optical fibers arranged in a row and an outer coating formed around the optical fibers. Each of the optical fibers has a core, a cladding, and a non-strippable thin coating made of synthetic resin with a Young's modulus of 50 kg/mm² to 250 kg/mm² at room temperature and coated around the cladding. The concentricity of the core to the diameter of the non-strippable thin coating is 1 μm or less.

11 Claims, 3 Drawing Sheets

OPTICAL FIBER

BACKGROUND OF THE INVENTION

1. Field of the Invention

The present invention relates to an optical fiber having a non-strippable thin coating disposed on a cladding.

2. Description of the Related Art

As shown in FIG. 5, an existing optical fiber ribbon is composed of a plurality of optical fibers 4 (normally, four to twelve fibers) and an outer coating 5. The optical fibers 4 are arranged in a row. The outer coating 5 is made of synthetic resin with a Young's modulus of 50 kgf/mm$^2$ to 100 kgf/mm$^2$ at room temperature. The outer coating 5 is disposed around the optical fibers 4. Each of the optical fibers 4 is composed of a core and cladding 1, a primary coating 2, and a secondary coating 3. The primary coating 2 is disposed around the cladding and made of synthetic resin with a Young's modulus of 0.1 kgf/mm$^2$ to 0.5 kgf/mm$^2$ at room temperature. The secondary coating 3 is disposed on the primary coating 2 and made of synthetic resin with a Young's modulus of 40 kgf/mm$^2$ to 100 kgf/mm$^2$ at room temperature. The coatings 2, 3 and 5 suppress a transmission characteristic from fluctuating against a lateral pressure and a temperature variation.

Each coating of the optical fiber ribbon has an optimum thickness so as to stably protect the characteristics of the core and cladding 1. For example, in the case of an optical fiber ribbon for use with a four single-mode (SM) fibers, the primary coating 2 and the secondary coating 3 are disposed on an SM optical fiber with a diameter of 125 $\mu$m in such a manner that the diameter of the primary coating 2 becomes 180 to 200 $\mu$m and the diameter of the secondary coating 3 becomes 230 to 250 $\mu$m. In addition, the outer coating 5 is disposed in such a manner that the ribbon width and ribbon thickness become 1.10 mm and 0.38 mm, respectively.

As optical communications have advanced in recent years, an optical fiber cable that densely contains optical fibers has been required. Thus, the improvement of the fiber density of an optical fiber ribbon, which is a basic dimension of an optical fiber cable, has been demanded.

Moreover, in recent years, a planar lightwave circuit (PLC device) has been densely structured. From this point of view as well, an optical fiber ribbon with a high fiber density has been demanded. As shown in FIG. 6, when a high density PLC fiber array with a distance of 125 $\mu$m between the center of the optical fibers is formed with two SM optical fiber ribbons with eight fibers 6 having a diameter of 250 $\mu$m, the core and cladding 1 with an diameter of 125 $\mu$m should be cross-bent. Thus, in addition to low workability, the bare fibers may contact in the fabrication process. Thereafter, the core and cladding 1 may break because of an aged deterioration due to a bend stress. Consequently, the reliability of the PLC device may deteriorate. Thus, a high density optical fiber ribbon for use with to a high density PLC device has been desired.

However, in the optical fiber ribbon, as described above, it is difficult to decrease the thickness of each coating for improvement of the fiber density since each coating is disposed with an optimum thickness necessary and sufficiently for stable characteristics of optical fibers. Thus, the optical fiber ribbon cannot satisfy such requirements.

SUMMARY OF THE INVENTION

This invention is disclosed in Japanese Patent Application No. 10-120911 filed on Apr. 30, 1998 and Japanese Patent Application No. 10-249846 filed on Sep. 3, 1998, and the entire disclosure thereof is incorporated herein by reference.

An object of the present invention is to provide an optical fiber ribbon with a high density in an optical fiber cable and that allows a PLC device to be structured with a high density.

A first aspect of the present invention is an optical fiber ribbon, comprising a plurality of optical fibers arranged in a row, and an outer coating formed around the 20 optical fibers, each of the optical fibers comprising a core, a cladding, and a non-strippable thin coating made of synthetic resin with a Young's modulus of 50 kg/mm$^2$ to 250 kg/mm$^2$ at room temperature and coated around the cladding.

The thickness of the non-strippable thin coating is preferably in the range from 2 $\mu$m to 15 $\mu$m.

The concentricity of the core to the diameter of the non-strippable thin coating is preferably 1 $\mu$m or less.

In a preferred embodiment, the outer coating has a primary coating made of synthetic resin with a Young's modulus of 0.01 kg/mm$^2$ to 0.5 kg/mm$^2$ at room temperature, and a secondary coating made of synthetic resin with a Young's modulus of 10 kg/mm$^2$ to 200 kg/mm$^2$ at room temperature.

The optical fibers are preferably almost closely arranged in a row. The primary coating is preferably formed in a ribbon shape of which the thickness thereof is twice or less than the diameter of each of the optical fibers and the width thereof is 30 $\mu$m to 100 $\mu$m longer than the total diameter of the optical fibers arranged in a row. The thickness of the secondary coating is preferably in the range from 20 $\mu$m to 100 $\mu$m.

In a preferred embodiment, each of the optical fibers also has a soft coating that is made of synthetic resin with a Young's modulus of 0.01 kg/mm$^2$ to 0.5 kg/mm$^2$ at room temperature and disposed on the non-strippable thin coating. The outer coating is preferably made of synthetic resin with a Young's modulus of 10 kg/mm$^2$ to 200 kg/mm$^2$ at room temperature.

The optical fibers are preferably almost closely arranged in a row. The diameter of the soft coating is preferably twice or less than the diameter of each of the optical fibers. The outer coating is preferably formed in a ribbon shape of which the thickness thereof is twice or less than the diameter of each of the optical fibers and the width thereof is 20 $\mu$m to 150 $\mu$m longer than the total diameter of the optical fibers arranged in a row.

The outer coating is preferably composed of synthetic resin with a Young's modulus of 10 kg/mm$^2$ to 200 kg/mm$^2$.

The optical fibers are preferably almost closely arranged in a row. The outer coating is preferably formed in a ribbon shape of which the thickness thereof is twice or less than the diameter of each of the optical fibers and the width thereof is 30 $\mu$m to 150 $\mu$m longer than the total diameter of the optical fibers arranged in a row.

According to one aspect of the present invention, the outer diameter of an optical fiber and of an optical fiber ribbon can be much sufficiently reduced than the conventional ones. Thus, since the distance between adjacent optical fibers is shortened, the fiber density can be improved. In addition, the characteristics of the optical fibers can be sufficiently protected by the non-strippable thin coating and the outer coating disposed around the optical fiber. Thus, the optical fiber ribbon accomplishes an optical fiber cable that densely contains optical fibers. In addition, when the optical fiber ribbon is used for a high density PLC device, the reliability thereof can be improved.

A second aspect of the present invention is an optical fiber, comprising a core, a cladding, and a non-strippable thin coating made of synthetic resin with a Young's modulus of 50 kg/mm² to 250 kg/mm² at room temperature and coated on the cladding, wherein the concentricity of the core to the diameter of the non-strippable thin coating is 1 μm or less.

The diameter of the non-strippable thin coating is preferably 125 μm.

The concentricity of the core to the diameter of the cladding of the optical fiber is preferably 1 μm or less.

In a preferred embodiment, the optical fiber further comprises a primary coating disposed on the non-strippable thin coating and made of synthetic resin with a Young's modulus of 0.01 kg/mm² to 0.5 kg/mm² at room temperature, and a secondary coating disposed on the primary coating and made of synthetic resin with a Young's modulus of 10 kg/mm² to 200 kg/mm².

According to an aspect of the present invention, optical fibers can be connected each other almost free of a splice loss. In addition, the optical fiber can be connected to a conventional optical fiber almost free of a splice loss.

These and other objects, features and advantages of the present invention will become more apparent in light of the following detailed description of a best mode embodiment thereof, as illustrated in the accompanying drawings.

DESCRIPTION OF PREFERRED EMBODIMENTS

With reference to the accompanying drawings, embodiments of the present invention will be described.

Figure 1:
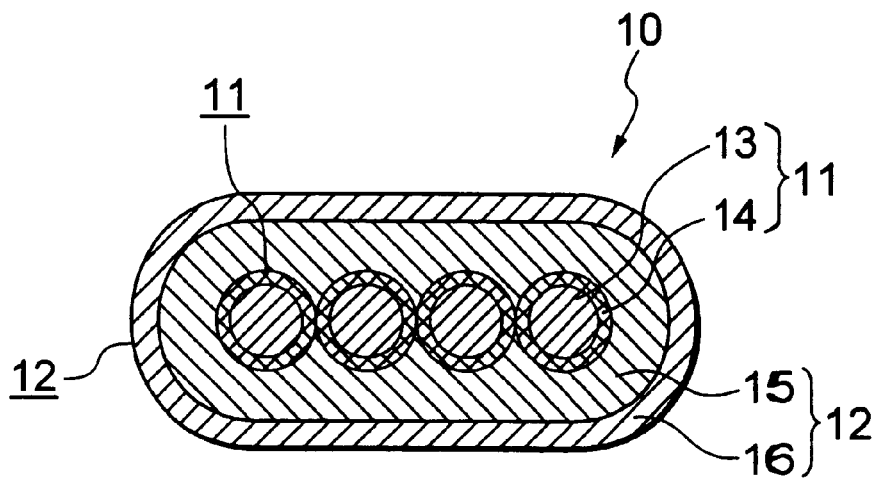
FIG. 1 is a sectional view showing an example of the structure of an optical fiber ribbon according to an embodiment of the present invention.

FIG. 1 is a sectional view showing an example of the structure of an optical fiber ribbon according to an embodiment of the present invention.

As shown in FIG. 1, an optical fiber ribbon 10 is composed of a plurality of optical fibers 11 and an outer coating. The optical fibers 11 are closely arranged in a row. The outer coating 12 is formed in a ribbon shape and disposed around the optical fibers 11. Each of the optical fibers 11 is composed of a core and cladding 13 and a non-strippable thin coating 14. The non-strippable thin coating 14 is made of synthetic resin with a Young's modulus of 50 kg/mm² to 250 kg/mm² at room temperature so that the non-strippable thin coating 14 is highly adhesive to the cladding. The outer coating 12 is composed of a primary coating 15 and a secondary coating 16. The primary coating 15 is made of synthetic resin with a Young's modulus of 0.01 kg/mm² to 0.5 g/mm² at room temperature. The secondary coating 16 is made of synthetic resin with a Young's modulus of 10 kg/mm² to 200 kg/mm² at room temperature.

The non-strippable thin coating 14 is used to improve the mechanical strength of the optical fibers 11 that are formed in a ribbon shape and connected to a connector or a PLC device or the like. From this point of view, the Young's modulus of the synthetic resin of the non-strippable thin coating is preferably as high as possible. Thus, according to the present invention, synthetic resin with a Young's modulus of 50 kg/mm² to 250 kg/mm² at room temperature should be used. In particular, synthetic resin with a Young's modulus of 100 kg/mm² to 150 kg/mm² at room temperature is preferably used.

The thickness of the non-strippable thin coating 14 is preferably in the range from 2 μm to 15 μm. When the thickness of the non-strippable thin coating 14 is less than 2 μm, it is difficult to coat it with an equal thickness. Thus, since a mechanically weak portion takes place, it is difficult to handle each optical fiber 11 at a fabrication process. Consequently, when each optical fiber 11 is formed in a ribbon shape, connected with a connector, or connected to a PLC device or the like, a core and cladding 13 may be damaged. In contrast, when the thickness of the non-strippable thin coating 14 exceeds 15 μm, microbending may take place in an optical fiber due to a difference of expansion coefficients.

As will be descried later, the non-strippable thin coating 14 is preferably formed in such a manner that concentricity of the core to the diameter of the optical fiber 11 becomes 1 μm or less. Thus, the optical fiber 11 can be connected with high reliability almost free of a splice loss.

The primary coating 15 may suppress a transmission loss of the optical fiber 13 from increasing at low temperature. In addition, the primary coating 15 may function as a buffer coating against a lateral pressure. Thus, the primary coating 15 may suppress a transmission loss due to a lateral pressure and a temperature variation from increasing. The effect of the primary coating 15 cannot be sufficiently obtained when the Young's modulus of the primary coating 15 is less than 0.01 kg/mm² or exceeds 0.5 kg/mm² at room temperature. The primary coating 15 is preferably formed in such a manner that the thickness thereof is twice or less than the diameter of the optical fiber 11 and the width thereof is 30 μm to 100 μm longer than the total diameter of the optical fibers arranged in a row.

The secondary coating 16 may allow the optical fiber ribbon to be handled at a fabrication process. In addition, the secondary coating 16 may prevent a transmission loss due to a lateral pressure from increasing along with the primary coating 15. The effect of the secondary coating 16 cannot be sufficiently obtained when the Young's modulus thereof is less than 10 kg/mm² or exceeds 200 kg/mm² at room temperature. When the Young's modulus of the secondary coating 16 is 10 kg/mm² or less at room temperature, the protection against a lateral pressure may be insufficient. When the Young's modulus of the secondary coating 16 exceeds 200 kg/mm², the contractile force due to a temperature variation may increase. Thus, the thickness of the secondary coating 16 is preferably in the range from 20 μm to 100 μm.

Examples of synthetic resin used for the non-strippable thin coating 14 are urethane resin, urethane acrylate resin, epoxy resin, epoxy acrylate resin, polyimide resin, polyorganosiloxane resin, carbon fluoride resin, and liquid resin with a functional group thereof. Examples of synthetic resin used for the primary coating 15 are urethane resin, urethane acrylate resin, polyorganosiloxane resin, and liquid resin with a functional group thereof. Examples of synthetic resin used for the secondary coating 16 are urethane resin, urethane acrylate resin, epoxy resin, epoxy acrylate resin, polyimide resin, polyamide resin, and liquid resin with a functional group thereof. When necessary, such resin is dissolved or dispersed with a solvent.

Each coating can be formed in such a manner that the resin is cured or cross-linked by UV light, visible light or electron radiation or heat. Alternatively, after the resin has been solved or dispersed with solvent, the resin may be coated and dried by heat.

Figure 5:
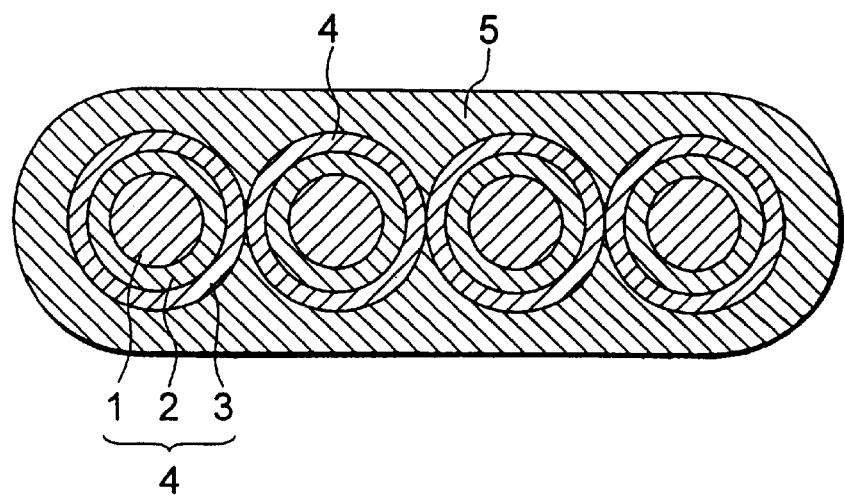
FIG. 5 is a sectional view showing an example of the structure of an existing optical fiber ribbon.
Figure 6:
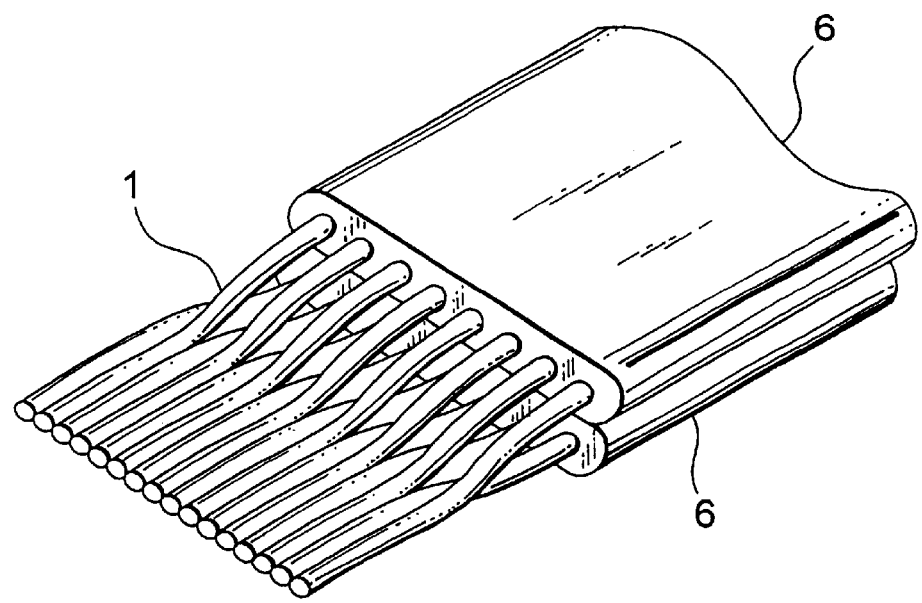
FIG. 6 is a perspective view showing an example of the structure of a fiber array for use with a high density PLC device using an existing optical fiber ribbon.

In the optical fiber 11 of the optical fiber ribbon, since the non-strippable thin coating 14 is deposited on the cladding, the optical fiber 11 can be handled as the optical fiber of the existing optical fiber ribbon in FIG. 5. In addition, since the core and cladding 13 is protected with the non-strippable thin coating 14 and the two-layer outer coating 12, the transmission characteristic of the core and cladding 13 does not deteriorate against a lateral pressure and a temperature variation.

When the optical fiber ribbon according to the present embodiment is compared with the existing optical fiber ribbon in FIG. 5 with the same number of optical fibers, as will be described later, the thickness and width of the former can be reduced. Thus, the fiber density can be improved. Consequently, with the optical fiber ribbon according to the present invention, a high density optical fiber cable can be accomplished. In addition, the optical fiber ribbon can be easily connected to a high density PLC device. Thus, the reliability of the high density PLC device can be improved.

Next, an optical fiber ribbon according to another embodiment of the present invention will be described.

Figure 2:
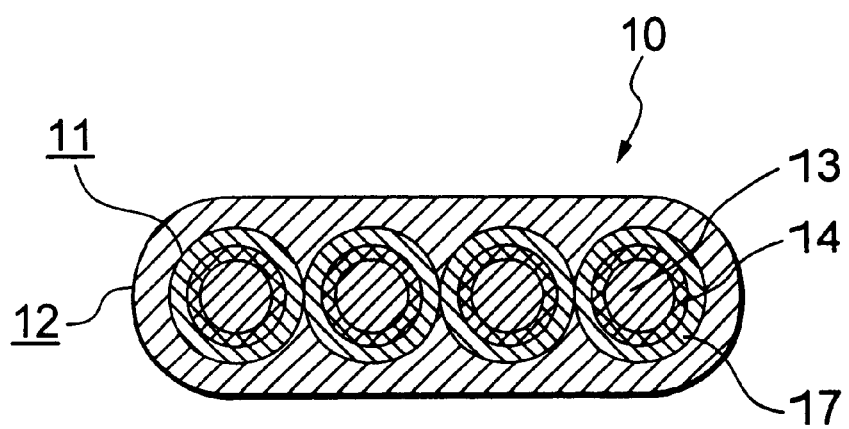
FIG. 2 is a sectional view showing an example of the structure of an optical fiber ribbon according to another embodiment of the present invention.

FIG. 2 is a sectional view showing an example of the structure of an optical fiber ribbon according to another embodiment of the present invention.

As with the optical fiber ribbon according to the embodiment shown in FIG. 1, an optical fiber ribbon shown in FIG. 2 is composed of a plurality of optical fibers 11 and an outer coating 12. The optical fibers 11 are closely arranged in a row. The outer coating 12 is coated in a ribbon shape around the optical fibers 11. However, unlike with the optical fiber ribbon shown in FIG. 1, the optical fiber 11 shown in FIG. 2 has a soft coating 17 deposited on the non-strippable thin coating 14. As with the primary coating 15, the soft coating 17 is made of synthetic resin with a Young's modulus of 0.01 kg/mm$^2$ to 0.5 kg/mm$^2$ at room temperature. As with the secondary coating 16, the outer coating 12 is made of synthetic resin with a Young's modulus of 10 kg/mm$^2$ to 200 kg/mm$^2$ at room temperature.

The soft coating 17 is preferably disposed on the non-strippable thin coating 14 in such a manner that the diameter of the soft coating 17 is twice or less than the diameter of the thin coating 14. In addition, the outer coating 12 is preferably coated in a ribbon shape in such a manner that the thickness of the outer coating 12 is twice or less than the diameter of each optical fiber and that the width of the outer coating 12 is 20 μm to 150 μm longer than the total diameter of the optical fibers arranged in a row.

In this embodiment, each optical fiber 11 can be handled as a plurality of optical fibers. In addition, the non-strippable thin coating 14, the soft coating 17 deposited thereon, and the outer coating 12 together protect the core and cladding 13. Thus, a lateral pressure and a temperature variation do not deteriorate the transmission characteristic of the core and cladding 13. Although the fiber density of the optical fiber ribbon shown in FIG. 1 is slightly lower than the fiber density of the optical fiber ribbon shown in FIG. 2, the fiber density of the latter is higher than the fiber density of the existing optical fiber ribbon.

Next, a further embodiment of the present invention will be described.

Figure 3:
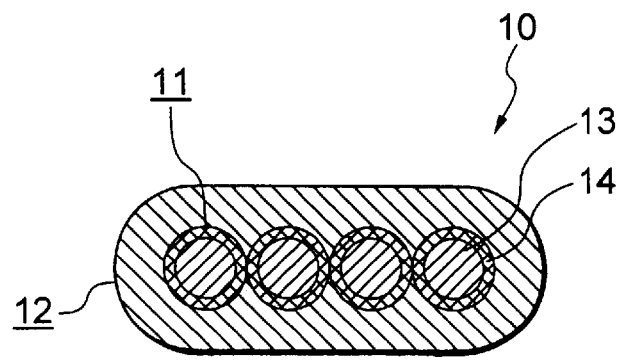
FIG. 3 is a sectional view showing an example of the structure of an optical fiber ribbon according to a further embodiment of the present invention.

FIG. 3 is a sectional view showing an example of the structure of an optical fiber ribbon according to the further embodiment of the present invention.

In FIG. 3, the optical fiber ribbon is composed of optical fibers 11 and an outer coating 12. As with the optical fiber ribbon shown in FIG. 1, each optical fiber 11 is composed of an core and cladding 13 and a non-strippable thin coating 14. The optical fibers 11 are closely arranged in a row. As with the optical fiber ribbon shown in FIG. 2, the outer coating 12 is coated around the optical fibers 11. The outer coating 12 is made of synthetic resin with a Young's modulus of 10 kg/mm$^2$ to 200 kg/mm$^2$ at room temperature. The outer coating 12 is preferably formed in a ribbon shape in such a manner that the thickness of the outer coating 12 is twice or less than the diameter of each optical fiber 11 and the width thereof is 30 μm to 150 μm longer than the total diameter of the optical fibers 11 arranged in a row.

The protection effect of the optical fiber ribbon shown in FIG. 3 is slightly inferior to the protection effect of the optical fiber ribbons shown in FIGS. 1 and 2. However, the occupation ratio of optical fibers of the optical fiber ribbon shown in FIG. 3 is superior to that of the optical fiber ribbons shown in FIGS. 1 and 2. Thus, the optical fiber ribbon shown in FIG. 3 is particularly suitable for a high density PLC fiber array. In such an application, since the optical fiber ribbon is used in a short direction, a strict protection effect against a lateral pressure and a temperature variation is not required unlike with an optical fiber ribbon for use with an optical fiber cable. Moreover, in such an application, an optical fiber ribbon with a higher occupation ratio of optical fibers is required.

The invention will now be explained in more detail by way of the following non-limiting examples. The Young's modulus of synthetic resin of each coating used in each optical fiber ribbon according to each example was measured corresponding to JIS K 7113. The gauge length was 25 mm. The pulling velocity was 1 mm/sec. The expansion distortion was 2.5%.

EXAMPLE 1

A 1.31 μm SM optical fiber whose mode field diameter was 9.3 μm and cladding diameter was 115 μm was prepared. As a non-strippable thin coating, urethane acrylate ultraviolet curable resin with a Young's modulus of 120 kg/mm$^2$ at 23° C. and 200 kg/mm$^2$ at −30° C. was coated on the cladding in such a manner that the diameter of the resin became 125 μm. Ultraviolet light was radiated to the resin of the non-strippable thin coating and thereby the resin was cured. Thus, an optical fiber was obtained. Four optical fibers were arranged in a row. As a primary coating, urethane acrylate ultraviolet curable resin with a Young's modulus of 0.1 kg/mm$^2$ at 23° C. and 1.0 kg/mm$^2$ at −40° C. was coated around the optical fibers in a ribbon shape whose thickness became 200 μm and width became 560 μm. Ultraviolet light was radiated to the resin of the primary coating and thereby the resin was cured. At once, as a secondary coating, urethane acrylate ultraviolet curable resin with a Young's modulus of 100 kg/mm² at 23° C. and 210 kg/mm² at −40° C. was coated on the primary coating in such a manner that the thickness of the resin became 25 μm. Ultraviolet light was radiated to the resin of the secondary coating and thereby the resin was cured. Thus, an optical fiber ribbon was obtained.

EXAMPLE 2

Eight optical fibers fabricated in the same manner as example 1 were arranged in a row. As a primary coating, urethane acrylate ultraviolet curable resin with a Young's modulus of 0.1 kg/mm² at 23° C. and 1.0 kg/mm² at −40° C. was coated around the optical fibers in a ribbon shape whose thickness became 200 μm and width became 1060 μm. Ultraviolet light was radiated to the resin of the primary coating and thereby the resin was cured. At once, as a secondary coating, urethane acrylate ultraviolet curable resin with a Young's modulus of 100 kg/mm² at 23° C. and −40° C. at −40° C. was coated on the primary coating in such a manner that the thickness of the secondary coating became 25 μm. Thus, an optical fiber ribbon was obtained.

EXAMPLE 3

Twelve optical fibers fabricated in the same manner as example 2 were arranged in a row. As a primary coating, urethane acrylate ultraviolet curable resin with a Young's modulus of 0.1 kg/mm² at 23° C. and 1.0 kg/mm² at −40° C. was coated around the optical fibers in a ribbon shape whose thickness became 200 μm and width became 1560 μm. Ultraviolet light was radiated to the resin of the primary coating and thereby the resin was cured. At once, as a secondary coating, urethane acrylate ultraviolet curable resin with a Young's modulus of 100 kg/mm² at 23° C. and −40° C. at −40° C. was coated on the primary coating in such a manner that the thickness of the secondary coating became 25 μm. Thus, an optical fiber ribbon was obtained.

EXAMPLE 4

Sixteen optical fibers fabricated in the same manner as example 1 were arranged in a row. As a primary coating, urethane acrylate ultraviolet curable resin with a Young's modulus of 0.1 kg/mm² at 23° C. and 1.0 kg/mm² at −40° C. was coated around the optical fibers in a ribbon shape whose thickness became 200 μm and width became 2060 μm. Ultraviolet light was radiated to the resin of the primary coating and thereby the resin was cured. At once, as a secondary coating, urethane acrylate ultraviolet curable resin with a Young's modulus of 100 kg/mm² at 23° C. and −40° C. at −40° C. was coated on the primary coating in such a manner that the thickness of the secondary coating became 25 μm. Thus, an optical fiber ribbon was obtained.

Compared Examples

The width and length of each of optical fiber ribbons according to examples 1–4 were compared with those of each of conventional optical fiber ribbons with the same number of optical fibers thereof. In other words, as a primary coating, urethane acrylate ultraviolet curable resin with a Young's modulus of 0.1 kg/mm² at 23° C. and 1.0 kg/mm² at −40° C. was coated on each optical fiber whose diameter was 125 μm in such a manner that the diameter of the resin became 200 μm. Ultraviolet light was radiated to the resin of the primary coating and thereby the resin was cured. As a secondary coating, urethane acrylate ultraviolet curable resin with a Young's modulus of 70 kg/mm² at 23° C. and 150 kg/mm² at −40° C. was coated on the primary coating in such a manner that the diameter of the resin of the secondary coating became 250 μm. Ultraviolet light was radiated to the resin of the secondary coating and thereby the resin was cured. Thus, an optical fiber was obtained. A predetermined number of optical fibers were arranged in a row. As an outer coating, urethane acrylate ultraviolet curable resin with a Young's modulus of 100 kg/mm² at 23° C. and 210 kg/mm² at −40° C. was coated in a ribbon shape around the optical fibers. Ultraviolet light was radiated to the resin of the outer coating and thereby the resin was cured. Thus, optical fiber ribbons were obtained. Table 1 compares the optical fiber ribbons according to examples 1–4 with conventional optical fiber ribbons that correspond thereto.

TABLE 1

|  | conventional structure | | structure according to present invention | |
| --- | --- | --- | --- | --- |
|  | ribbon thick-ness (mm) | ribbon width (mm) | ribbon thick-ness (mm) | ribbon width (mm) |
| 4 fibers | 0.38 | 1.10 |  |  |
| 4 fibers (thin type) | 0.33 | 1.12 | 0.25 | 0.61 | Example 1 |
| 8 fibers | 0.33 | 2.12 | 0.25 | 1.11 | Example 2 |
| 12 fibers | 0.33 | 3.12 | 0.25 | 1.61 | Example 3 |
| 16 fibers | — | — | 0.25 | 2.11 | Example 4 |

As is clear from Table 1, the thickness and width of 8-fiber ribbon according to the second example are almost the same as those of the conventional 4-fiber ribbon. Thus, when the number of fibers of an optical fiber ribbon according to the present invention is the same as that of a conventional optical fiber ribbon, the thickness and width of the former are smaller than those of the latter. Consequently, according to the present invention, a higher density optical fiber cable can be accomplished. For example, a 300-fiber (4-fiber ribbons×5 sheets×15 slots) optical fiber cable for use with a conventional 4-fiber ribbon can be sustituted with a 720-fiber (8-fiber ribbons×6 sheets×15 slots) optical fiber cable for use with an 8-fiber ribbon according to example 2. In this case, the fiber density is increased 2.4 times. Likewise, a 600-fiber (8-fiber ribbons×10 sheets×8 slots) optical fiber cable and a 1000-fiber (8-fiber ribbons×10 sheets×13 slots) optical fiber cable for use with a conventional 8-fiber ribbon can be substituted with a 1660-fiber (16-fiber ribbons×13 sheets×8 slots) optical fiber cable and a 2700-fiber (16-fiber ribbons×13 sheets×13 slots) optical fiber cable for use with a 16-fiber ribbon according to example 4 can be accomplished. In this case, the fiber density is increased 2.7 times.

The variations of the transmission loss against temperature variations from −40° C. to 80° C. of the optical fiber ribbons according to examples 1–4 were 0.02 dB/km or less. Experimental results show that the transmission loss does not vary in slot-type fiber cables using the optical fiber ribbons according to the examples.

EXAMPLE 5

A 1.31 μm SM optical fiber whose mode field diameter was 9.3 μm and cladding diameter was 115 μm was prepared. As a non-strippable thin coating, urethane acrylate ultraviolet curable resin with a Young's modulus of 120 kg/mm² at 23° C. and 200 kg/mm² at −30° C. was coated on the cladding in such a manner that the diameter of the resin became 125 μm.

Ultraviolet light was radiated to the resin of the non-strippable thin coating and thereby the resin was cured. Thus, an optical fiber was obtained. As a soft coating, urethane acrylate ultraviolet curable resin with a Young's modulus of 0.1 kg/mm² at 23° C. and 1.0 kg/mm² at −40° C. was coated on the non-strippable thin coating in such a manner that the diameter of the resin became 180 μm. Ultraviolet light was radiated to the resin of the soft coating and thereby the resin was cured. Four optical fibers were arranged in a row. As an outer coating, urethane acrylate ultraviolet curable resin with a Young's modulus of 70 kg/mm² at 23° C. and 150 kg/mm² at −30° C. was coated around the optical fibers in a ribbon shape whose thickness became 200 μm and width became 560 μm. Ultraviolet light was radiated to the resin of the outer coating and thereby the resin was cured. Thus, an optical fiber ribbon was obtained.

EXAMPLE 6

Eight optical fibers fabricated in the same manner as example 5 were arranged in a row. As an outer coating, urethane acrylate ultraviolet curable resin with a Young's modulus of 100 kg/mm² at 23° C. and 210 kg/mm² at −40° C. was coated around the optical fibers in a ribbon shape whose thickness became 200 μm and width became 1490 μm. Ultraviolet light was radiated to the resin of the outer coating and thereby the resin was cured. Thus, an optical fiber ribbon was obtained.

EXAMPLE 7

Twelve optical fibers fabricated in the same manner as example 6 were arranged in a row. As an outer coating, urethane acrylate ultraviolet curable resin with a Young's modulus of 100 kg/mm² at 23° C. and 210 kg/mm² at −40° C. was coated around the optical fibers in a ribbon shape whose thickness became 200 μm and width became 2210 μm. Ultraviolet light was radiated to the resin of the outer coating and thereby the resin was cured. Thus, an optical fiber ribbon was obtained.

EXAMPLE 8

Sixteen optical fibers fabricated in the same manner as example 5 were arranged in a row. As an outer coating, urethane acrylate ultraviolet curable resin with a Young's modulus of 100 kg/mm² at 23° C. and 210 kg/mm² at −40° C. was coated around the optical fibers in a ribbon shape whose thickness became 200 μm and width became 2930 μm. Ultraviolet light was radiated to the resin of the outer coating and thereby the resin was cured. Thus, an optical fiber ribbon was obtained.

Compared Examples

Table 2 compares the thickness and width of the optical fiber ribbons according to examples 5–8 with those of conventional equivalent optical fiber ribbons.

TABLE 2

|  | conventional structure | | structure according to present invention | | |
| --- | --- | --- | --- | --- | --- |
|  | ribbon thickness (mm) | ribbon width (mm) | ribbon thickness (mm) | ribbon width (mm) | |
| 4 fibers | 0.38 | 1.10 | | | |
| 4 fibers (thin type) | 0.33 | 1.12 | 0.25 | 0.77 | Example 5 |
| 8 fibers | 0.33 | 2.12 | 0.25 | 1.49 | Example 6 |
| 12 fibers | 0.33 | 3.12 | 0.25 | 2.21 | Example 7 |
| 16 fibers | — | — | 0.25 | 2.93 | Example 8 |

As is clear from Table 2, when the optical fiber ribbons according to examples 5–8 are compared with conventional equivalent optical fiber ribbons, the thickness and width of each optical fiber ribbon according to examples 5–8 are decreased. Thus, it is clear that the occupation ratio of optical fibers improves.

As with example 1, the variations of the transmission loss against temperature variations from −40° C. to 80° C. of the optical fiber ribbons according to examples 5–8 were 0.02 dB/km or less. Experimental results show that the transmission loss does not vary in slot-type fiber cables using the optical fiber ribbons according to examples 1–4.

EXAMPLE 9

Four optical fibers fabricated in the same manner as the first example were arranged in a row. As an outer coating, urethane acrylate ultraviolet curable resin with a Young's modulus of 100 kg/mm² at 23° C. and 210 kg/mm² at −40° C. was coated around the optical fibers in a ribbon shape whose thickness became 200 μm and width became 0.56 μm. Ultraviolet light was radiated to the resin of the outer coating and thereby the resin was cured. Thus, an optical fiber ribbon was obtained.

EXAMPLE 10

Eight optical fibers fabricated in the same manner as example 1 were arranged in a row. As an outer coating, urethane acrylate ultraviolet curable resin with a Young's modulus of 100 kg/mm² at 23° C. and 210 kg/mm² at −40° C. was coated around the optical fibers in a ribbon shape whose thickness became 200 μm and width became 1.06 μm. Ultraviolet light was radiated to the resin of the outer coating and thereby the resin was cured. Thus, an optical fiber ribbon was obtained.

EXAMPLE 11

Twelve optical fibers fabricated in the same manner as example 1 were arranged in a row. As an outer coating, urethane acrylate ultraviolet curable resin with a Young's modulus of 100 kg/mm² at 23° C. and 210 kg/mm² at −40° C. was coated around the optical fibers in a ribbon shape whose thickness became 200 μm and width became 1.56 μm. Ultraviolet light was radiated to the resin of the outer coating and thereby the resin was cured. Thus, an optical fiber ribbon was obtained.

EXAMPLE 12

Sixteen optical fibers fabricated in the same manner as example 1 were arranged in a row. As an outer coating, urethane acrylate ultraviolet curable resin with a Young's modulus of 100 kg/mm² at 23° C. and 210 kg/mm² at −40° C. was coated around the optical fibers in a ribbon shape whose thickness became 200 μm and width became 2.06 μm. Ultraviolet light was radiated to the resin of the outer coating and thereby the resin was cured. Thus, an optical fiber ribbon was obtained.

Compared Examples

Table 3 compares the thickness and width of the optical fiber ribbons according to examples 9–12 with those of conventional equivalent optical fiber ribbons.

TABLE 3

|  | conventional structure | | structure according to present invention | | |
| --- | --- | --- | --- | --- | --- |
|  | ribbon thickness (mm) | ribbon width (mm) | ribbon thickness (mm) | ribbon width (mm) |  |
| 4 fibers | 0.38 | 1.10 |  |  |  |
| 4 fibers (thin type) | 0.33 | 1.12 | 0.20 | 0.56 | Example 9 |
| 8 fibers | 0.33 | 2.12 | 0.20 | 1.06 | Example 10 |
| 12 fibers | 0.33 | 3.12 | 0.20 | 1.56 | Example 11 |
| 16 fibers | — | — | 0.20 | 2.06 | Example 12 |

As is clear from Table 3, when the optical fiber ribbons according to examples 9–12 are compared with conventional equivalent optical fiber ribbons, the thickness and width of each optical fiber ribbon according to examples 9–12 are decreased. Thus, it is clear that the occupation ratio of optical fibers improves.

Next, with reference to the FIG. 4, an optical fiber according to an embodiment of the present invention will be described.

Figure 4:
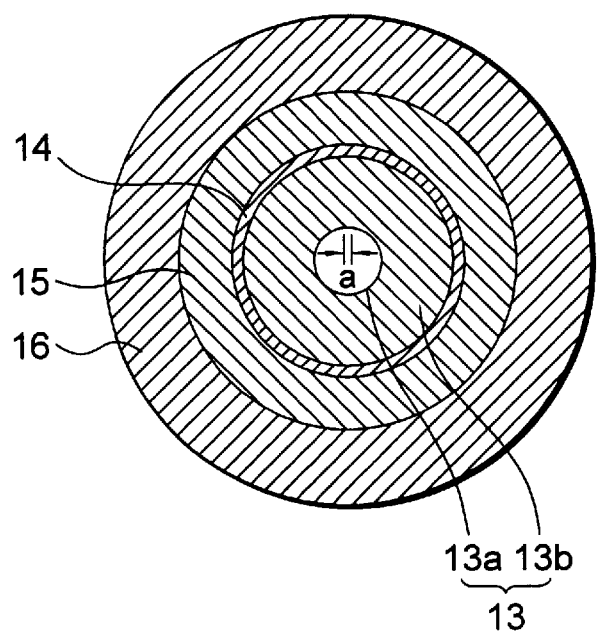
FIG. 4 is a sectional view showing an example of the structure of an optical fiber according to the present invention.

FIG. 4 is a sectional view showing an example of the structure of an optical fiber according to the embodiment.

As shown in FIG. 4, in this embodiment, a non-strippable thin coating 14 is coated on an SM optical fiber 13. The SM optical fiber 13 is composed of a core 13a and a cladding 13b. The diameter of the core 13a is generally in the range from 5 μm to 15 μm. The non-strippable thin coating 14 is made of synthetic resin with a Young's modulus of 50 kg/mm² to 250 kg/mm² at room temperature. The non-strippable thin coating 14 is highly adhesive to the cladding 13b of the optical fiber 13. The diameter of the non-strippable thin coating 14 is 125 μm. The concentricity of the core 13a to the diameter of the non-strippable thin coating is 1 μm or less. A primary coating 15 and a secondary coating 16 are successively coated on the non-strippable thin coating 14. The primary coating 15 is made of synthetic resin with a Young's modulus of 0.01 kg/mm² to 0.5 kg/mm² at room temperature. The secondary coating 16 is made of synthetic resin with a Young's modulus of 10 kq/mm² to 200 kg/mm² at room temperature. The primary coating 15 has low adhesion to the non-strippable thin coating 14.

When such optical fibers are connected, although the primary coating 15 and the secondary coating 16 are easily stripped off together, the non-strippable thin coating 14 adheres to the cladding 13b and thereby protects the cladding 13b. Thus, the optical fibers can be easily connected with a clamp-type connector free of a damage of the core and cladding 13. In addition, since the concentricity amount of the core 13a to the diameter of the non-strippable thin coating 14 is 1 μm or less, a splice loss hardly takes place. Moreover, the optical fiber according to the present invention can be connected to a conventional SM optical fiber (whose cladding diameter is 125 μm and whose concentricity of the core to the cladding diameter is 1 μm or less) almost free of a splice loss. When the concentricity of the core 13a to the diameter of the non-strippable thin coating 14 exceeds 1 μm, the splice loss becomes large. Thus, in this case, the optical fiber cannot be practically used.

According to the present invention, it is required that the concentricity of the core 13a to the diameter of the non-strippable thin coating 14 be 1 μm or less. Although the concentricity of the core 13a to the cladding diameter is not limited, in consideration of the transmission characteristic of the optical fiber, the concentricity of the core 13a to the cladding diameter is preferably 1 μm or less.

In addition, according to the present invention, the non-strippable thin coating 14 should be made of synthetic resin with a Young's modulus of 50 kg/mm² to 250 kg/mm² at room temperature. When the Young's modulus is less than 50 kg/mm², the non-strippable thin coating 14 is easily stripped from the cladding. In addition, when the optical fibers are connected, the optical fibers may not be properly protected. On the other hand, when the Young's modulus exceeds 250 kg/mm², the contracting force due to a temperature variation may increase. According to the present invention, synthetic resin with a Young's modulus of 100 kg/mm² to 150 kg/mm² at room temperature is preferably used.

The thickness of the non-strippable thin coating 14 is preferably in the range from 2 μm to 15 μm. When the thickness of the non-strippable thin coating 14 is less than 2 μm, it is difficult to coat with the cladding by a die. In addition, the cladding 13b cannot be properly protected. Thus, when the optical fibers are connected, the core and cladding 13 may be damaged. In contrast, when the thickness of the non-strippable thin coating 14 exceeds 15 μm, microbending due to a difference of expansion coefficients take place in the optical fiber 11. Consequently, the transmission loss may increase. The thickness of the non-strippable thin coating 14 is more preferably in the range from 5 μm to 10 μm.

In the above-descried example, the primary coating 15 made of synthetic resin with a Young's modulus of 0.01 kg/mm² to 0.5 kg/mm² at room temperature and the secondary coating 16 made of synthetic resin with a Young's modulus of 10 kg/mm² to 200 kg/mm² at room temperature are disposed on the non-strippable thin coating 14. However, the present invention is not limited to such a structure as long as the stripping characteristic of a coating to the non-strippable thin coating 14 and the protection of the optical fiber 11 (for suppressing a transmission loss due to a lateral pressure and a temperature variation from increasing) is obtained.

However, the primary coating 15 made of synthetic resin with a Young's modulus of 0.01 kg/mm² to 0.5 kg/mm² at room temperature suppresses a transmission loss of the optical fiber 13 from increasing at room temperature. In addition, the secondary coating 16 made of synthetic resin with a Young's modulus of 10 kg/mm² to 200 kg/mm² at room temperature prevents a transmission loss due to a lateral pressure from increasing. Thus, the structure having at least these two layers is preferably used. The thickness of the primary coating 15 is preferably in the range from 5 μm to 100 μm. The thickness of the secondary coating 16 is preferably in the range from 5 μm to 150 μm.

Examples of synthetic resin of each coating is the same as those of the above-described optical fiber ribbon.

To allow the concentricity of the core 13a to the diameter of the non-strippable thin coating 14 to be 1 μm or less, in the fabrication process of a preform rod, the concentricity and concentricity direction of the core to the cladding diameter are obtained. When the non-strippable thin coating 14 is coated, the center position of the die and the center position of the line from a heating furnace of an optical fiber drawing unit to a receiving unit are adjusted corresponding to the obtained concentricity and concentric direction of the core. In other words, when the concentricity of the core to the cladding in the preform rod is 1 μm or less and the center of the die is matched with the center of the entire line, the concentricity of the core to the diameter of the non-strippable thin coating 14 becomes 1 μm or less. When the concentricity of the core to the cladding in the preform rod is 1 μm or more, the center position of the die and the center position of the entire line of the drawing unit are adjusted so that the concentricity of the core to the non-strippable thin coating 14 becomes 1 μm or less.

Next, optical fibers according to one aspect of the present invention will be described. In the following examples, the Young's modulus was measured corresponding to JIS K 7113. The gauge length was 25 mm. The pulling velocity was 1 mm/min. The expansion distortion was 2.5%.

EXAMPLE 13

While a 1.31 μm SM optical fiber whose mode field diameter was 9.3 μm and cladding diameter was 115 μm was being drawn from a preform rod that had been fabricated by an existing method, as a non-strippable thin coating, urethane acrylate ultraviolet curable resin with a Young's modulus of 100 kg/mm$^2$ at 23° C. was coated thereon in such a manner that the diameter became 125 μm and the concentricity of the core to the diameter of the non-strippable thin coating became 1 μm or less. Ultraviolet light was radiated to the resin of the non-strippable thin coating and thereby the resin was cured. Since the concentricity of the core of the preform rod was 1 μm or less, the resin was coated in such a manner that the center of the die was matched with the center of the line of the drawing unit.

Next, as a primary coating, urethane acrylate ultraviolet curable resin with a Young's modulus of 0.1 kg/mm$^2$ at 23° C. was coated around the non-strippable thin coating. Ultraviolet light was radiated to the resin of the primary coating and thereby the resin was cured. As a secondary coating, urethane acrylate ultraviolet curable resin with a Young's modulus of 70 kg/mm$^2$ at 23° C. was coated on the primary coating. Ultraviolet light was radiated to the resin of the secondary coating and thereby the resin was cured. Thus, an optical fiber was obtained.

EXAMPLE 14

An optical fiber was obtained in the same manner as example 13 except that the center of the die and the center of the line of the drawing unit were moved because the concentricity of the core to the cladding diameter of the preform rod was 1 μm or more.

The primary and secondary coatings of two optical fibers were removed and the optical fibers were connected with a clamp-type connector. The splice loss of the connected optical fiber was measured. Table 4 shows the measured splice loss, the cladding diameter of the core, and the concentricity of the first coating (non-strippable thin coating) to the diameter of the optical fiber according to each of examples 13 and 14 and a conventional optical fiber as a compared example.

TABLE 4

|  | Example 13 | Example 14 | compared example |
|---|---|---|---|
| concentricity of core to cladding (μm) | 0.15 | 1.1 | 0.1 |
| concentricity of core to first coating (μm) | 0.2 | 0.3 | — |
| splice loss (db) | <0.1 | <0.1 | <0.1 |

As is clear from Table 4, the splice loss of the optical fiber according to each of the present invention is 0.1 dB or less. Thus, it was assured that these optical fibers can be practically used.

Although the present invention has been shown and described with respect to a best mode example thereof, it should be understood by those skilled in the art that the foregoing and various other changes, omissions, and additions in the form and detail thereof may be made therein without departing from the spirit and scope of the present invention.

What is claimed is:

1. An optical fiber ribbon, comprising:
   a plurality of optical fibers arranged in a row; and
   an outer coating formed around the optical fibers,
   each of the optical fibers comprising a core, a cladding, and a non-strippable thin coating composed of synthetic resin with a Young's modulus of 50 kg/mm$^2$ to 250 kg/mm$^2$ at room temperature and coated around the cladding,
   wherein the thickness of the non-strippable thin coating is in the range from 2 μm to 15 μm, and
   wherein the eccentricity between the center of the core and the center of the non-strippable thin coating is not more than 1 μm.

2. The optical fiber ribbon as set forth in claim 1,
   wherein the outer coating comprises a primary coating composed of synthetic resin with a Young's modulus of 0.01 kg/mm$^2$ to 0.5 kg/mm$^2$ at room temperature, and a secondary coating composed of synthetic resin with a Young's modulus of 10 kg/mm$^2$ to 200 kg/mm$^2$ at room temperature.

3. The optical fiber ribbon as set forth in claim 2,
   wherein the optical fibers are almost closely arranged in a row,
   wherein the primary coating is formed in a ribbon shape of which the thickness thereof is not more than twice the diameter of each of the optical fibers and the width thereof is 30 μm to 100 μm longer than the total diameter of the optical fibers arranged in a row, and
   wherein the thickness of the secondary coating is in the range from 20 μm to 100 μm.

4. The optical fiber ribbon as set forth in claim 1,
   wherein each of the optical fibers comprises a soft coating composed of synthetic resin with a Young's modulus of 0.01 kg/mm² to 0.5 kg/mm² at room temperature and disposed on the non-strippable thin coating, and wherein the outer coating is composed of synthetic resin with a Young's modulus of 10 kg/mm² to 200 kg/mm² at room temperature.

5. The optical fiber ribbon as set forth in claim 4, wherein the optical fibers are almost closely arranged in a row, wherein the diameter of the soft coating is not more than twice the diameter of each of the optical fibers, and wherein the outer coating is formed in a ribbon shape of which the thickness thereof is not more than twice the diameter of each of the optical fibers and the width thereof is 20 μm to 150 μm longer than the total diameter of the optical fibers arranged in a row.

6. The optical fiber ribbon as set forth in claim 1, wherein the outer coating is composed of synthetic resin with a Young's modulus of 10 kg/mm² to 200 kg/mm².

7. The optical fiber ribbon as set forth in claim 6, wherein the optical fibers are almost closely arranged in a row, and wherein the outer coating is formed in a ribbon shape of which the thickness thereof is not more than twice the diameter of each of the plurality of optical fibers and the width thereof is 30 μm to 150 μm longer than the total diameter of the optical fibers arranged in a row.

8. The optical fiber ribbon as set forth in claim 1, wherein the diameter of the non-strippable thin coating is 125 μm.

9. An optical fiber, comprising:

a core;

a cladding; and a non-strippable thin coating composed of synthetic resin with a Young's modulus of 50 kg/mm² to 250 kg/mm² at room temperature and coated on the cladding, wherein the thickness of the non-strippable thin coating is in the range from 2 μm to 15 μm, and wherein the eccentricity between the center of the core and the center of the non-strippable thin coating is not more than 1 μm.

10. The optical fiber as set forth in claim 9, wherein the diameter of the non-strippable thin coating is 125 μm.

11. The optical fiber as set forth in claim 9, further comprising:

a primary coating disposed on the non-strippable thin coating and composed of synthetic resin with a Young's modulus of 0.01 kg/mm² to 0.5 kg/mm² at room temperature; and a secondary coating composed of synthetic resin with a Young's modulus of 10 kg/mm² to 200 kg/mm² and disposed on the primary coating.

* * * * *